(12) United States Patent
Lim (10) Patent No.: US 7,289,483 B1
(45) Date of Patent: Oct. 30, 2007

(54) CELL SEARCH APPARATUS AND METHOD IN CDMA MOBILE COMMUNICATION SYSTEM

(75) Inventor: Chae-Man Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/558,237

(22) Filed: Apr. 24, 2000

(30) Foreign Application Priority Data

Apr. 24, 1999 (KR) ............................. 1999 14737

(51) Int. Cl.
  *H04B 7/216* (2006.01)
  *H04J 3/06* (2006.01)
(52) U.S. Cl. .................. 370/342; 370/350; 370/503
(58) Field of Classification Search ................ 370/342, 370/479; 375/142, 147, 150, 350, 503
See application file for complete search history.

(56) References Cited

U.S. PATENT DOCUMENTS

| | | | |
|---|---|---|---|
| 6,504,830 B1 * | 1/2003 | Ostberg et al. | 370/342 |
| 6,526,091 B1 * | 2/2003 | Nystrom et al. | 375/142 |
| 6,603,735 B1 * | 8/2003 | Park et al. | 370/208 |
| 2002/0057664 A1 * | 5/2002 | Sarkar | 370/342 |

FOREIGN PATENT DOCUMENTS

| | | |
|---|---|---|
| EP | 0 954 113 | 11/1999 |
| JP | 11-088293 | 3/1999 |
| JP | 11-088295 | 3/1999 |
| JP | 2001-515294 | 9/2001 |
| JP | 2002-510158 | 4/2002 |
| JP | 2002-518960 | 6/2002 |
| WO | WO99/00912 | 1/1999 |
| WO | WO99/12273 | 3/1999 |
| WO | WO99/12295 | 3/1999 |
| WO | WO99/37040 | 7/1999 |
| WO | WO99/66754 | 12/1999 |

OTHER PUBLICATIONS

European Search Report dated Jun. 11, 2003, issued in a counterpart application, namely, Appln. No. 00921160.8.

* cited by examiner

*Primary Examiner*—Kevin C. Harper
(74) *Attorney, Agent, or Firm*—The Farrell Law Firm, P.C.

(57) ABSTRACT

There is provided a cell search apparatus and method in a mobile communication system. The cell search apparatus is slot time-synchronized by receiving a first synchronization code in each slot of a P-SCH frame and in addition receives over the slots of an S-SCH frame a base station group specific code representing one of base station groups and a base station specific code representing one of base stations in the base station group. In the cell search apparatus, a base station group specific code detecting unit detects the base station group specific code received on the S-SCH in the slot-synchronized state, and a base station specific code detecting unit detects a transmitting base station by detecting the base station specific code received following the base station group specific code.

17 Claims, 8 Drawing Sheets

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | 2 | 11 | 6 | 3 | 15 | 7 | 8 | 8 | 7 | 15 | 3 | 6 | 11 | 2 |
| 2 | 1 | 2 | 9 | 3 | 10 | 11 | 13 | 13 | 11 | 10 | 3 | 9 | 2 | 1 | 16 | 16 |
| 3 | 1 | 3 | 16 | 12 | 14 | 2 | 11 | 2 | 17 | 12 | 16 | 3 | 1 | 13 | 4 | 13 |
| 4 | 1 | 4 | 6 | 4 | 1 | 10 | 9 | 8 | 17 | 14 | 12 | 14 | 17 | 6 | 9 | 10 |
| 5 | 1 | 5 | 13 | 13 | 5 | 1 | 7 | 14 | 3 | 16 | 8 | 8 | 16 | 3 | 14 | 7 |
| 6 | 1 | 6 | 3 | 5 | 9 | 9 | 8 | 3 | 6 | 1 | 4 | 2 | 15 | 15 | 2 | 4 |
| 7 | 1 | 7 | 10 | 14 | 13 | 17 | 3 | 9 | 9 | 3 | 17 | 13 | 14 | 10 | 7 | 1 |
| 8 | 1 | 8 | 17 | 6 | 17 | 8 | 1 | 15 | 12 | 5 | 13 | 7 | 13 | 5 | 12 | 15 |
| 9 | 1 | 9 | 7 | 15 | 4 | 16 | 16 | 4 | 15 | 7 | 9 | 1 | 12 | 17 | 17 | 12 |
| 10 | 1 | 10 | 14 | 7 | 8 | 7 | 14 | 10 | 1 | 9 | 5 | 12 | 11 | 12 | 5 | 9 |
| 11 | 1 | 11 | 4 | 16 | 12 | 15 | 12 | 16 | 4 | 11 | 1 | 6 | 10 | 7 | 10 | 6 |
| 12 | 1 | 12 | 11 | 8 | 16 | 6 | 10 | 5 | 7 | 13 | 14 | 17 | 9 | 2 | 15 | 3 |
| 13 | 1 | 13 | 1 | 17 | 3 | 14 | 8 | 11 | 10 | 15 | 10 | 11 | 8 | 14 | 3 | 17 |
| 14 | 1 | 14 | 8 | 9 | 7 | 5 | 6 | 17 | 13 | 17 | 6 | 5 | 7 | 9 | 8 | 14 |
| 15 | 1 | 15 | 15 | 1 | 11 | 13 | 4 | 6 | 16 | 2 | 2 | 16 | 6 | 4 | 13 | 11 |
| 16 | 1 | 16 | 5 | 10 | 15 | 4 | 2 | 12 | 2 | 4 | 15 | 10 | 5 | 16 | 1 | 8 |
| 17 | 1 | 17 | 12 | 2 | 2 | 12 | 17 | 1 | 5 | 6 | 11 | 4 | 4 | 11 | 6 | 5 |
| 18 | 2 | 8 | 11 | 15 | 14 | 1 | 4 | 10 | 10 | 4 | 1 | 14 | 15 | 11 | 8 | 2 |
| 19 | 2 | 9 | 1 | 7 | 1 | 9 | 2 | 16 | 13 | 6 | 14 | 8 | 14 | 6 | 13 | 16 |
| 20 | 2 | 10 | 8 | 16 | 5 | 17 | 17 | 5 | 16 | 8 | 10 | 2 | 13 | 1 | 1 | 13 |
| 21 | 2 | 11 | 15 | 8 | 9 | 8 | 15 | 11 | 2 | 10 | 6 | 13 | 12 | 13 | 6 | 10 |
| 22 | 2 | 12 | 5 | 17 | 13 | 16 | 13 | 17 | 5 | 12 | 2 | 7 | 11 | 8 | 11 | 7 |
| 23 | 2 | 13 | 12 | 9 | 17 | 7 | 11 | 6 | 8 | 14 | 15 | 1 | 10 | 3 | 16 | 4 |
| 24 | 2 | 14 | 2 | 1 | 4 | 15 | 9 | 12 | 11 | 16 | 11 | 12 | 9 | 15 | 4 | 1 |
| 25 | 2 | 15 | 9 | 10 | 8 | 6 | 7 | 1 | 14 | 1 | 7 | 6 | 8 | 10 | 9 | 15 |
| 26 | 2 | 16 | 16 | 2 | 12 | 14 | 5 | 7 | 17 | 3 | 3 | 17 | 7 | 5 | 14 | 12 |
| 27 | 2 | 17 | 6 | 11 | 16 | 5 | 3 | 13 | 3 | 5 | 16 | 11 | 6 | 17 | 2 | 9 |
| 28 | 2 | 1 | 13 | 3 | 3 | 13 | 1 | 2 | 6 | 7 | 12 | 5 | 5 | 12 | 7 | 6 |
| 29 | 2 | 2 | 3 | 12 | 7 | 4 | 16 | 8 | 9 | 9 | 8 | 16 | 4 | 7 | 12 | 3 |
| 30 | 2 | 3 | 10 | 4 | 11 | 12 | 14 | 14 | 12 | 11 | 4 | 10 | 3 | 2 | 17 | 17 |
| 31 | 2 | 4 | 17 | 13 | 15 | 3 | 12 | 3 | 15 | 13 | 17 | 4 | 2 | 14 | 5 | 14 |
| 32 | 2 | 5 | 7 | 5 | 2 | 11 | 10 | 9 | 1 | 15 | 13 | 15 | 1 | 9 | 10 | 1 |

| s(1,1) | s(1,2) | ... | s(1,15) | s(1,16) |
|---|---|---|---|---|
| s(2,1) | s(2,2) | ... | s(2,15) | s(2,16) |
| ⋮ | ⋮ | ⋮ | ⋮ | ⋮ |
| s(16,1) | s(16,2) | ... | s(16,15) | s(16,16) |
| s(17,1) | s(17,2) | ... | s(17,15) | s(17,16) |

← Cyclic shift

FIG. 7A

| s(1,2) | s(1,3) | ... | s(1,16) | s(1,1) |
|---|---|---|---|---|
| s(2,2) | s(2,3) | ... | s(2,16) | s(2,1) |
| ⋮ | ⋮ | ⋮ | ⋮ | ⋮ |
| s(16,2) | s(16,3) | ... | s(16,16) | s(16,1) |
| s(17,2) | s(17,3) | ... | s(17,16) | s(17,1) |

← Cyclic shift

CELL SEARCH APPARATUS AND METHOD IN CDMA MOBILE COMMUNICATION SYSTEM

PRIORITY

This application claims priority to an application entitled "Cell Search Apparatus and Method in CDMA Mobile Communication System" filed in the Korean Industrial Property Office on Apr. 24, 1999 and assigned Serial No. 99-14737, the contents of which are hereby incorporated by reference.

BACKGROUND OF THE INVENTION

1. Field of the Invention

The present invention relates generally to a mobile telecommunication system, and in particular, to a cell search apparatus and method in an asynchronous base station (BS) and a mobile station (MS).

2. Description of the Related Art

The UMTS (Universal Mobile Telecommunication System) is an asynchronous BS system in which an inter-BS operation is asynchronously done. Each constituent BS in the system is assigned to a unique cell specific code for identification. If the UMTS includes 512 cells (i.e. 512 BSs) for instance, 512 cell specific codes are assigned to the respective 512 BSs. To search for its serving BS, an MS should search the 512 BSs by checking the phases of their cell specific codes, consuming a large amount of time. To overcome the inefficiency of the conventional cell search algorithm, a multi-step cell search algorithm has been explored. For implementation of the multi-step cell search algorithm, the BSs in the UMTS are divided into a predetermined number of groups (e.g., 32 or 64 groups), each BS group being assigned to a different group specific code. Thus, for 512 base stations, each BS group is comprised of 16 BSs. Each of the 16 BSs is assigned to a different broadcasting channel (BCH) spreading code (cell specific code) so that the MS can search for its serving BS. This multi-step cell search algorithm includes the steps of (1) receiving a primary synchronization channel (P-SCH) signal from a serving BS and synchronizing to the slot time of a slot received with the highest power; (2) receiving a secondary synchronization channel (S-SCH) signal from the BS while the MS is synchronized with the slot time and detecting frame synchronization and the group specific code of the BS; and (3) searching for the cell specific code of the BS by means of a BCH received from the BS based on the frame synchronization and the BS group specific code.

The multi-step cell search algorithm will be described in detail referring to FIGS. 1, 2, and 3.

Figure 1:
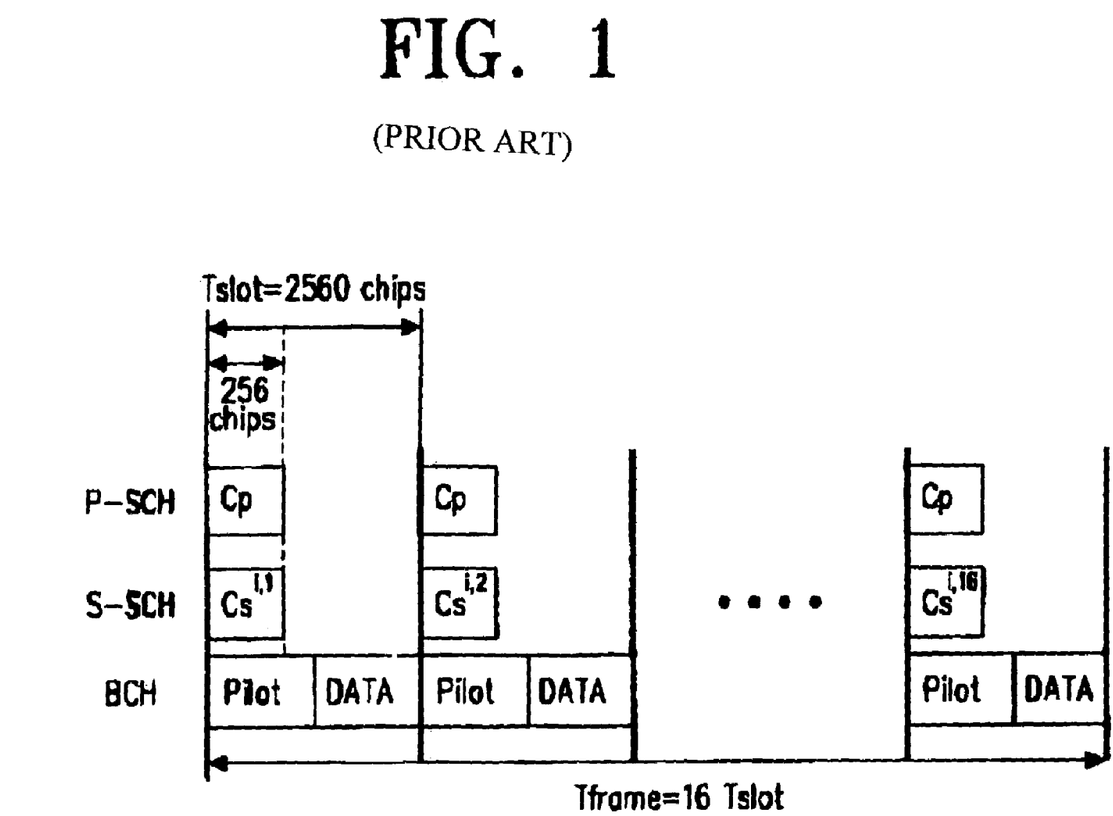
FIG. 1 is a conventional UMTS channel structure.

FIG. 1 illustrates a conventional UMTS channel structure. Along the time axis of a channel signal transmitted by a BS, one UMTS slot has 2,560 chips and 16 slots form one frame. Thus, one frame has 40,960 chips.

A P-SCH is the same code for each BS in the UMTS. It is transmitted with a synchronization code #0, SC 0, for a tenth of the each slot period, that is, for 256 chips. Then, an MS receives the P-SCH and synchronizes with a BS slot time (the first cell search step).

Along with the P-SCH, the BS transmits its BS group specific code on an S-SCH. The BS group specific code is a 16-symbol codeword. The 16 symbols corresponds to 16 synchronization codes selected from $1^{st}$ to $17^{th}$ synchronization codes SC1 to SC17 and each symbol is mapped in one of the 16 slots of one frame. The slot-time synchronized MS acquires the group specific code and frame synchronization of the serving BS from the received S-SCH (the second cell search step).

A BCH message signal transmitted along with the S-SCH signal is comprised of pilot and data symbols in each slot. The BCH message signal is spread with a cell specific code (a BS specific code), one of the 32 scrambling (cell specific code) code which mapped with the 16-symbol codeword, synchronization codes SC1 to SC16. The MS despreads the BCH signal with the 32 scrambling codes and selects a cell specific code with a maximum correlation as the BS specific code (the third cell search step).

The third cell search step will be described in detail referring to FIG. 2.

Figure 2:
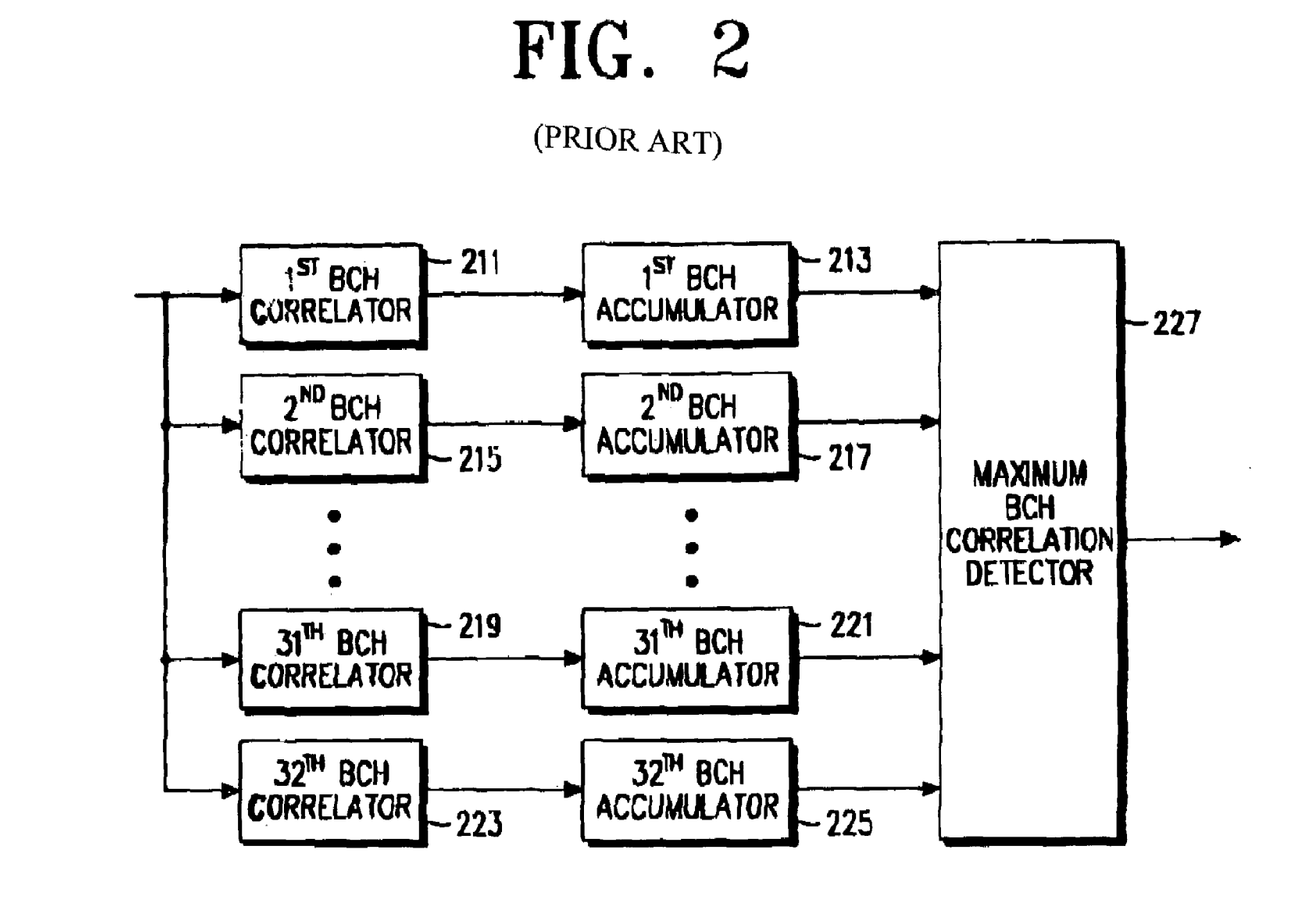
FIG. 2 is a block diagram of a conventional cell search apparatus for the third cell search step.

FIG. 2 is a block diagram of a conventional cell search apparatus to implement the third cell search step. Referring to FIG. 2, the MS, frame-synchronized with the BS and informed of the BS group in the second cell search step, receives the BCH signal at $1^{st}$ to $32^{th}$ correlators 211 to 223 in the cell search apparatus. Each BS group in the UMTS has 32 cell specific codes and a BCH signal is spread with one of the 32 scrambling code (cell specific code) which mapped with the 16-symbol codeword, synchronization codes SC1 to SC16. That is why the MS has 32 correlators to despread the BCH signal. The $1^{st}$ correlator 211 calculates a correlation of the BCH signal in an auto-correlation function for a $1^{st}$ cell specific code (scrambling code), a $2^{nd}$ BCH correlator 215 calculates a correlation of the BCH signal in an auto-correlation function for a $2^{nd}$ cell specific code (scrambling code), a $31^{th}$ BCH correlator 219 calculates a correlation of the BCH signal in an auto-correlation function for a $31^{th}$ cell specific code (scrambling code), and a $32^{th}$ BCH correlator 223 calculates a correlation of the BCH signal in an auto-correlation function for a $16^{th}$ cell specific code (scrambling code). Here, $3^{rd}$ to $30^{th}$ BCH correlators are not shown for convenience sake, but each unshown correlator calculates a correlation of the BCH signal in an auto-correlation function for the $3^{rd}$ to $30^{th}$ synchronization code. Then, the correlations are accumulated in $1^{st}$ to $32^{th}$ BCH accumulators 213 to 225. That is, the $1^{st}$ BCH accumulator 213 accumulates the correlation received from the $1^{st}$ BCH correlator 211, the $2^{nd}$ BCH accumulator 217 the correlation received from the $2^{nd}$ BCH correlator 211, the $31^{th}$ BCH accumulator 221 the correlation received from the $31^{th}$ BCH correlator 219, and the $32^{th}$ BCH accumulator 225 the correlation received from the $32^{th}$ BCH correlator 223. Though not shown, $3^{rd}$ to $30^{th}$ BCH accumulators accumulate the correlations received from the $3^{rd}$ to $30^{th}$ BCH correlators, respectively. A maximum BCH correlation detector 227 detects a maximum of the BCH accumulator outputs received from each BCH accumulator, to determine the BS specific code.

To detect its serving BS, as described above, the MS should perform the first to third cell search steps sequentially. This cell search method has the distinctive problems that (1) complex additions involved in the multi-step cell search consume a large amount of time and especially 16×256 complex calculations required to detect correlations of a 256-chip sequence with respect to 16 second synchronization codes take a long time and increase hardware load; (2) the requirement of 32 correlators corresponding to the BS specific codes for the third cell search step increases hardware complexity; and (3) many computations caused by concurrent parallel operation of the correlators leads to excess power consumption in an MS.

SUMMARY OF THE INVENTION

It is, therefore, an object of the present invention to provide a cell search apparatus and method for simplifying cell search steps in order to reduce a cell search time.

It is another object of the present invention to provide a cell search apparatus and method which can reduce hardware complexity.

These and other objects can be achieved by providing a cell search apparatus and method in a mobile communication system. The cell search apparatus is slot time-synchronized by receiving a first synchronization code in each slot of a P-SCH frame and receives a base station group specific code representing one of base station groups and a base station specific code representing one of base stations in the base station group over the slots of an S-SCH frame. In the cell search apparatus, a base station group specific code detecting unit detects the base station group specific code received on the S-SCH after the slot-synchronized state, and a base station specific code detecting unit detects the base station specific code received following the base station group specific code.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 3:
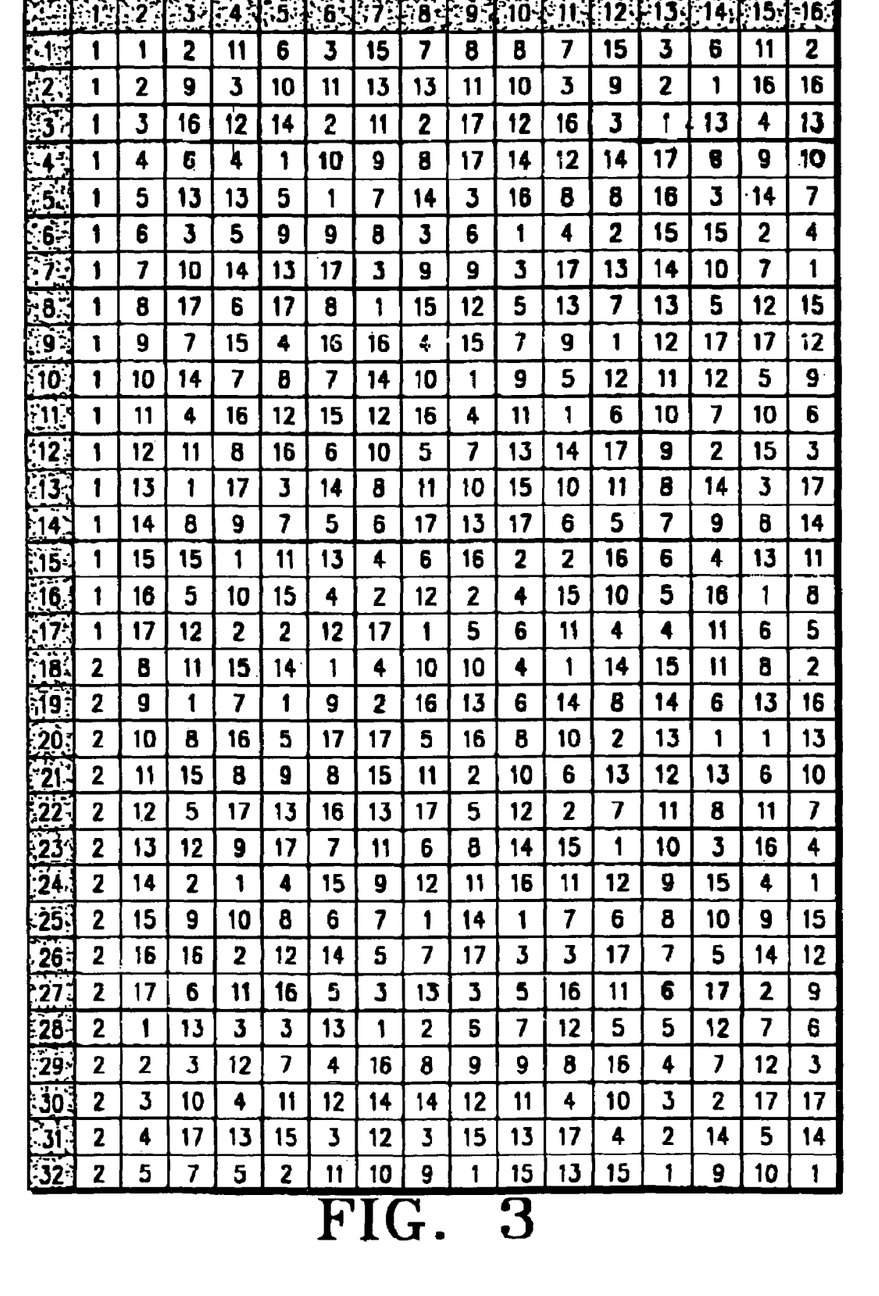
FIG. 3 is a comma free code table.
Figure 4:
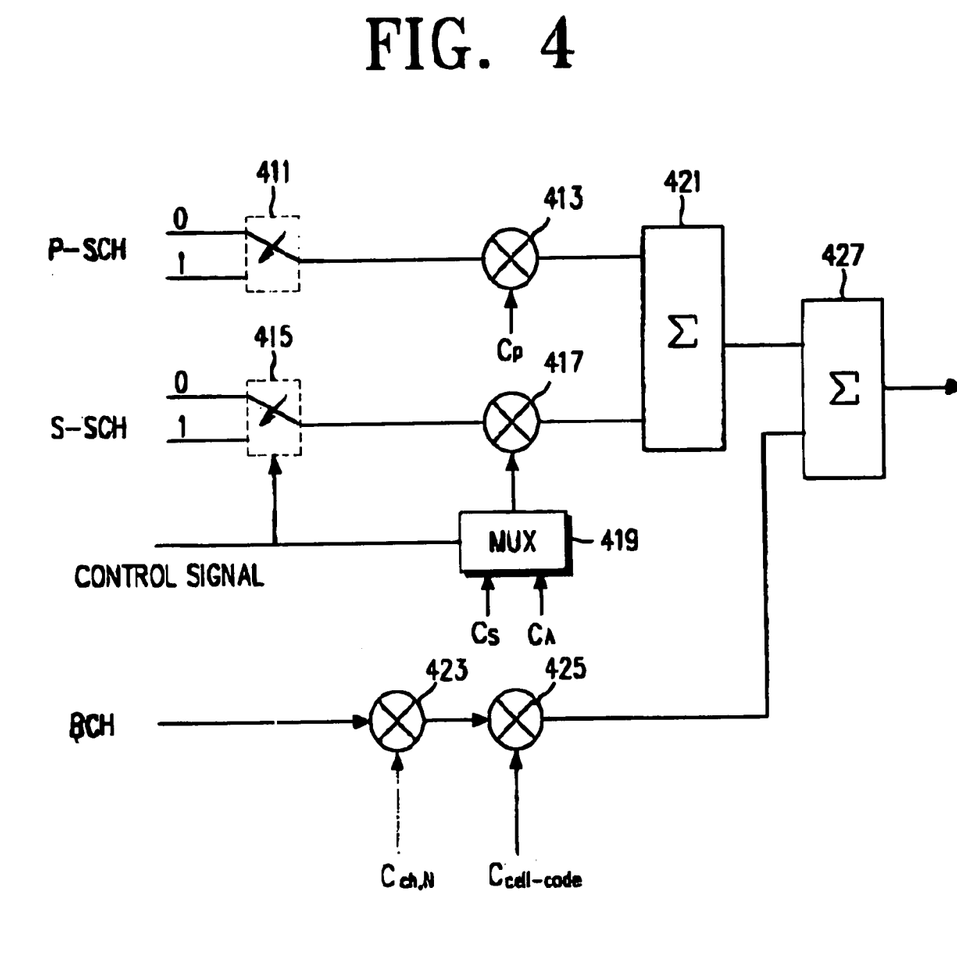
FIG. 4 is a block diagram of a transmitter for cell search in a BS according to an embodiment of the present invention.
Figure 5A:
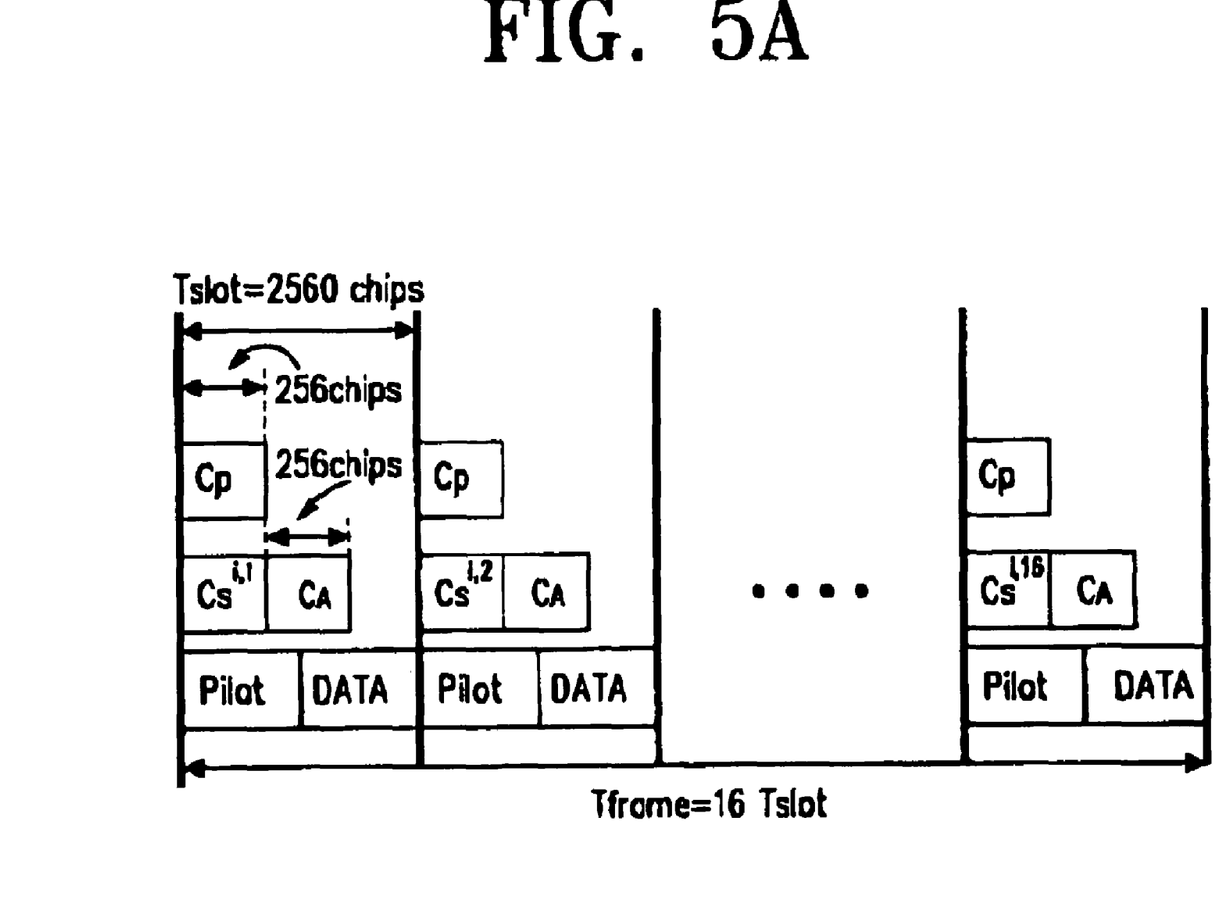
FIG. 5A is an embodiment of a UMTS channel structure according to the present invention.
Figure 5B:
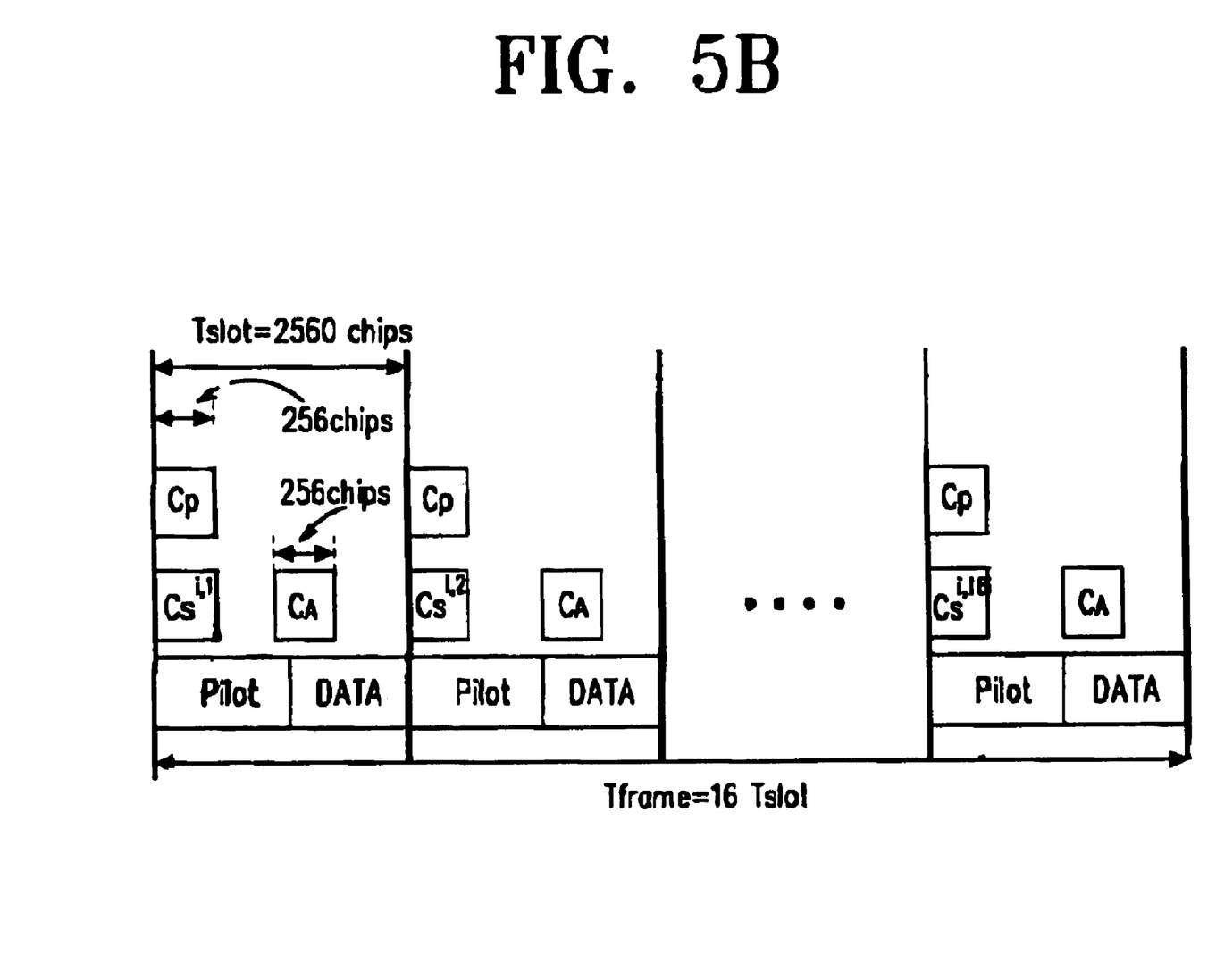
FIG. 5B is another embodiment of the UMTS channel structure according to the present invention.

FIG. 3 is a comma free code table, FIG. 4 is a block diagram of a transmitter for cell search in a BS according to an embodiment of the present invention, and FIGS. 5A and 5B are embodiments of a UMTS channel structure according to the present invention.

Referring to FIG. 4, the BS transmits a P-SCH signal to provide slot-time synchronization. A switch 411 is switched to a logic high terminal for a time period (256 chips) of transmitting a synchronization code on the P-SCH and to a logic low terminal for a non-synchronization code transmission period (2,304 chips) in each slot according to a predetermined control signal. While the switch 411 is being switched to the logic high terminal, a mixer 413 mixes the P-SCH signal received from the switch 411 with a synchronization code SC0, which is the synchronization code $C_p$ assigned to P-SCH. The mixed signal is fed to an adder 421.

To provide frame synchronization and a BS group specific code, the BS transmits an S-SCH. A switch 415 is switched to a logic high terminal for an S-SCH transmission period and to a logic low terminal for a non-S-SCH transmission period in each slot. While the switch 415 is being switched to the logic high terminal, a different specific code is transmitted in each slot of an S-SCH frame. A BS specific code follows the BS group specific code on the S-SCH. Because the periods of transmitting the BS group specific code and the BS specific code are each 256 chips, the switch 415 is switched to the logic high terminal for 512 chips. While the BS specific code succeeds to the BS group specific code in the embodiment of the present invention, the successive transmission is not requisite as long as both the BS and the MS know both code transmission periods.

Now, there will be given a description of generation of synchronization codes mixed on the P-SCH and S-SCH. A synchronization code is generated by XOR gating (modulo addition of) an HDS (Hadamard Sequence) and an HRS (Hierarchical Sequence). The HRS y is generated out of sequences $x_1$ and $x_2$ with lengths $n_1$ and $n_2$, respectively.

$$y(i) = x_2(i \bmod n_2) + x_1(i \text{ div } n_1) \text{ for } i = 0, 1, \ldots, (n_1 \times n_2 - 1)$$

and $x_1$ and $x_2$ of the same length are selected and one of LS (Linder Sequence):

$$x_1 = x_2 = \{0,0,1,1,1,1,0,1,0,0,1,0,0,0,1,0\}$$

The HDSs are obtained as the rows in a matrix $H_8$ constructed recursively by:

$$H_0 = (1)$$

$$H_k = \begin{pmatrix} H_{k-1} & H_{k-1} \\ H_{k-2} & H_{k-1} \end{pmatrix}, \quad k \geq 1$$

The rows are numbered from top starting with row 0 (the all ones sequence) Denote the nth HDS as a row of $H_8$ numbered from the top, $n = 0, 1, 2, \ldots, 255$, in the sequel.

Therefore, let $h_m(i)$ and $y(i)$ denote the ith symbol of the sequence $h_m$ and y, respectively where $i = 0, 1, 2, \ldots, 255$ and $i = 0$ corresponds to the leftmost symbol.

By XOR-gating a 256-chip HDS $h_m(i)$ and the HRS $y(i)$, a kth synchronization code is then defined as $$C_{SC,k} = \{h_m(0) + y(0), h_m(1) + y(1), h_m(2) + y(2), \ldots h_m(255) + y(255)\},$$

Where $m = 8 \times k$, $k = 0, 1, 2, \ldots 17$ and leftmost chip in the sequence corresponds to the chip transmitted firs in time.

Then, synchronization code #0, SC0 generated in the above manner is assigned to the P-SCH, where $$C_p = C_{SC,0}$$

The other synchronization codes, SC1 to SC17 are assigned in the respective slots of an S-SCH frame.

$$C_s^i = C_{SC,i} (i = 1, 2, 3, \ldots, 17)$$

To use FHT (Fast Hadamard Transform), the specific HDSs have to be selected. A procedure of selecting the HDS $h_m(i)$ will be described hereinbelow. If the maximum number of channels that a BS can assign is M and each channel spares a sequence of length M for a code, $$H(k,i)=H_{(k+i)\cdot L}, (i=0, 1, 2, \ldots, P-1)$$

where N: length of sequences in a sub-Hadamard matrix $H_N$ of a Hadamard matrix $H_M$;

M: length of sequences in a Hadamard matrix assigned to an actual channel;

L: M/N (number of segments), that is, M sequences are (L×N) sequences;

P: number of channels (maximum channel number: M); and k: initial value when selecting a sequence in the Hadamard matrix $H_M$ ($0 \leq k \leq L-1$).

For example, M=16, N=4, L=16/4=4, P=4, and k=2. Then, 4 sequences is composed by Base sequence S can be selected from a Hadamard matrix $H_{16}$ with a coefficient 16.

row 2=(1 −1 1 −1 1 −1 1 −1 1 −1 1 −1 1 −1 1 −1)
row 6=(1 −1 1 −1 −1 1 −1 1 1 −1 1 −1 −1 1 −1 1)
row 10=(1 −1 1 −1 1 −1 1 −1 −1 1 −1 1 −1 1 −1 1)
row 14=(1 −1 1 −1 −1 1 −1 1 −1 1 −1 1 1 −1 1 −1)
or
row 2=(+S +S +S +S)
row 6=(+S −S +S −S)
row 10=(+S +S −S −S)
row 14=(+S −S −S +S)

where a base sequence S=(1 −1 1 −1).

Meanwhile, for the period when the switch 415 is being switched to the logic high terminal, a mixer 417 mixes the S-SCH signal with a signal received from a multiplexer (MUX) 419 and the adder 421 adds the P-SCH signal and the output of the mixer 417. The MUX 419 multiplexes a synchronization code $C_S$ of the BS group specific code with a synchronization code $C_A$ of the BS specific code according to a BS control signal. The BS group specific code is transmitted by a comma free code on the comma free code table of FIG. 3. Each comma free code includes 16-symbol code word. Each symbol represents synchronization code, indicating a BS group. The comma free code table has as many comma free codes as the BS groups of the UMTS, that is, 32 comma free codes. Each comma free code is a 16-symbol codeword and each symbol represents a synchronization code number for a BS group specific code to be transmitted on an S-SCH. Since the codewords are mutually orthogonal even after they are cyclically shifted, BS frame synchronization and a BS group can be detected by checking codes assigned in the slots of one frame. The BS transmits synchronization codes corresponding to a comma free code being its BS group specific code on the S-SCH in the respective slots. For example, if the BS belongs to a second group, the BS maps a comma free code indicative of the second BS group in the comma free code table on the S-SCH. Each symbol of the comma free code transmits for a 1/10 of one slot, that is, 256 chips. The BS of the second group maps SC1, SC2, SC9, SC3, SC10, SC11, SC13, SC13, SC11, SC10, SC3, SC9, SC2, SC1, SC16 and SC16 in this order as the $1^{st}$ to $16^{th}$ symbols of the comma free code on the S-SCH. The BS also inserts its BS specific code, for example SC5 if it has a fifth BS specific code in its BS group, in the $257^{th}$ through the $512^{th}$ chip, following the BS group specific code. This channel structure is shown in FIG. 5A.

On the other hand, it can be further contemplated that the BS specific code can be inserted a predetermined period, for example, 512 chips after the BS group specific code in each slot, as shown in FIG. 5B.

Following formation of the S-SCH, the BS constructs a BCH. To do so, a mixer 423 spreads transmission data with a channel code $C_{ch,N}$ and then a mixer 425 mixes the output of the mixer 423 with the BS specific code $C_{cell\text{-}code}$ (i.e., $C_A$) and feeds the result to an adder 427. Eventually, the P-SCH and the S-SCH are added with the BCH.

Figure 6:
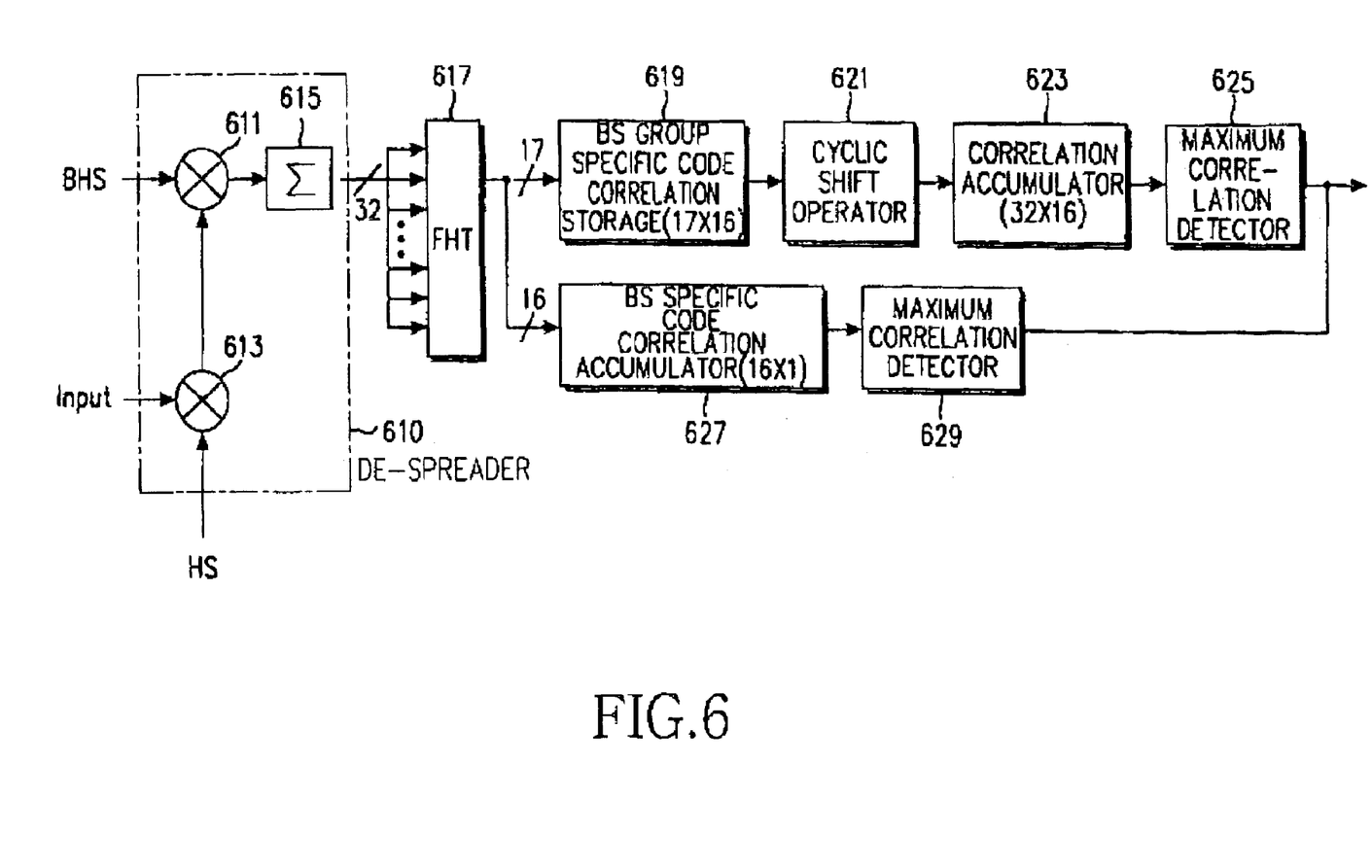
FIG. 6 is a block diagram of a cell search apparatus in an MS according to the embodiment of the present invention.
Figure 7A:
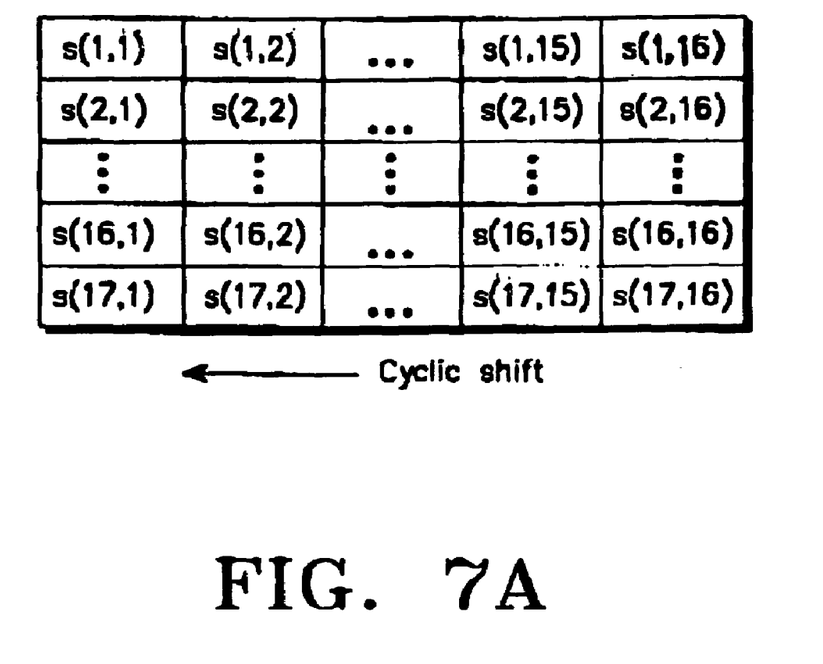
FIG. 7A is a BS group specific code correlation table.
Figure 7B:
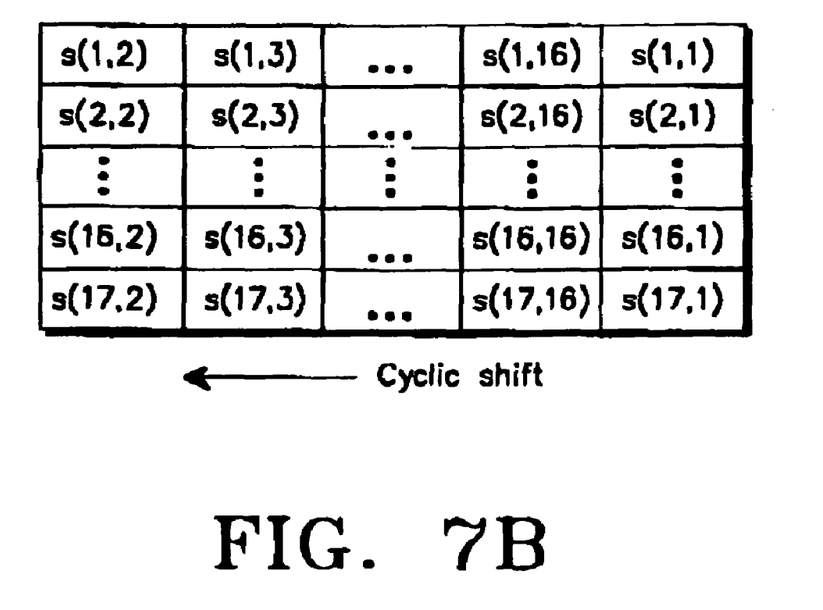
FIG. 7B is a BS group specific code correlation table resulting from cyclically shifting the BS group specific code correlations shown in FIG. 7A.

FIG. 6 is a block diagram of a cell search apparatus in an MS according to the embodiment of the present invention, FIG. 7A is a BS group specific code correlation table, and FIG. 7B is a BS group specific code correlation table resulting from cyclically shifting the BS group specific code correlations shown in FIG. 7A.

The MS $2^{nd}$ step cell search apparatus of the present invention will be described referring to FIGS. 6, 7A, and 7B.

The following description is conducted on the assumption that a BS transmits a channel of the structure shown in FIG. 5A. After initial slot synchronization, the MS should despread a received signal with HRS since the synchronization code is produced by XOR-gating an HRS and a HDS (Hadamard Sequence). To use FHT (Fast Hadamard Transformer), the HRS component only has to be remained. So, a mixer 613 mixes the input signal with the HRS. To demodulate 32 channels from an input signal (received signal), a mixer 611 and a accumulator 615 perform 8 correlation of length 32 consecutive sub segments of the despreaded signal with length 8 BHDS (11111111). The accumulator 615 is reset at every 8 time intervals. In this manner, 32 correlation points for the 32 channels are generated.

The output of the mixer 611 is an original transmission signal of the BS prior to spreading. An FHT (Fast Hadamard Transform) unit 617, including 5 ($\log_2 32$) FHTs, generates 32 correlation values to the parallel 32 inputs (the accumulator 615 output=32 correlation values) but only 17 ones (i.e., SC1 to SC17) among the 32 correlations are to be in use.

Because the 32 correlation points are generated by despreading a sequence of length 256 with a BHDS of length 8 and then fed to the FHT unit 617 in parallel, the order of the FHT unit 617 is extended to 32. As a result, the number of complex additions is 416 ($8 \times 32 + 32 \times \log_2 32$). The FHT unit 617 outputs 17 correlations to a BS group specific code correlation storage 619. A total of 16×17 correlations are stored in the BS group specific code correlation storage 619 since the BS group specific code is detected on a frame basis and 17 correlations are calculated for each of 16 slots in one frame. The process of storing the correlations in the BS group specific code correlation storage 619 will now be described.

A despreader 610 in the second-step cell search apparatus receives an S-SCH on which synchronization codes are mapped according to a comma free code representative of a BS group specific code. The despreader 610 generates an HS and mixes it with the input signal at the mixer 613. The mixer 611 correlates the signal received from the mixer 613 to an 8-chip BHDS and the adder 615 accumulates an 8-chip correlation received from the mixer 611. Here, the adder 615 is reset at every 8 chips. Since the input S-SCH is 256 chips, 32 orthogonal segments are produced. Then, 32 correlation points detected from the 32 segments are fed to the FHT unit 617. The FHT unit 617 detects 32 correlations from the 32 correlation points according to auto-correlation functions. However, only 17 correlations corresponding to SC1 to SC17 among the 32 correlations are used. Upon complete detection of correlations of one S-SCH frame, 16×17 correlations are stored in the BS group specific code correlation storage 619.

FIG. 7A illustrates an S-SCH correlation table with 16×17 (column×row) correlations in the BS group specific code correlation storage 619.

To do convenient explanation of decision variable calculation procedure, it is assumed that the correlation result array of one frame is s[17][16] the correlation accumulator 619), the decision variable array is Y[32][16] (the correlation accumulator 623), and comma free code table array is C[32][16].

The reason for storing the 16×17 correlations is that one frame has 16 time slots including the S-SCH. The correlation values of the SCH in each slot of the input frame are stored column by column. That is, correlation values of the S-SCH in the first slot are arranged in a first column, s(1, 1), s(2, 1), . . . , s(16, 1), s(17, 1). Correlation values of the S-SCH in the second slot are arranged in a second column, s(1, 2), s(2, 2), . . . , s(2, 16), s(2, 17). Finally, correlation values of the S-SCH in the 16th slot are arranged in a sixteenth column s(16, 1), s(16, 2), . . . , s(16, 16), s(16, 17). When the 16×17 correlation values are completely stored in the BS group specific code correlation storage 619 at the end of the input frame, a cyclic shift operator 621 reads a comma free code table from its inner memory, compares the S-SCH correlations with comma free codes in the comma free code table, and feeds the resulting mapped correlation values to a correlation accumulator 623 (in which store decision variable). The cyclic shift operator 621 refers to the comma free code table for the initial S-SCH correlation value s(1, 1) shown in FIG. 7A. A first codeword in the comma free code table has 1 as its first symbol, which implies that the BS mapped a synchronization code corresponding to symbol 1, that is, the first synchronization code SC1 on the S-SCH prior to transmission. Hence, the correlation accumulator 623 stores s(1,1) in Y(1,1). As same manner, the other correlation values mapped to the other symbols of first codeword inserted in the other slot are sequentially accumulated in Y(1,1) too. The same procedures are performed to the other codeword. So, the accumulated values of 0 cyclic shift version are stored in the first row of 32×16 decision variable memory Y(accumulator 623).

While the cyclic shift operator 621 cyclically shift S-SCH correlation values 15 times as shown in FIG. 7B, the procedure is described in the top is performed. The correlation accumulator 623 accumulatively stores 32×16 decision variables. Upon completion of the correlation value accumulation, a maximum correlation detector 625 detects a maximum of the correlation values. Within the correlation value storage 623, a maximum correlation value detector 625 detects the maximum value (i, j) whose first index i corresponds to BS group specific code and the second index j determines frame synchronization, i.e. the beginning of next frame in (16-j)% 16 slots. Therefore, the MS detects an offset to thereby acquire frame synchronization to the BS and find out the BS group.

If do the detailed description of calculation of the decision variable in the top, The Calculation algorithm is carried out in the following way:

for(i=0; i<32; i++)

for(j=0; j<16; j++){Y[i][j]=0; for(k=0; k<16; k++)
        Y[i][j]+=s[C[i][(k+j)%16]][k];}, These calculations are performed with the purpose of summation of correlation results in various combinations (32×16=512).

While the BS group specific code is detected on a frame basis as described above, a synchronization code indicating a BS specific code is mapped repeatedly in all the slots of one frame and thus the BS specific code is detected on a slot basis.

As shown in FIG. 5A, the BS specific code is inserted into the $257^{th}$ chip through $512^{th}$ chip following the BS group specific code in each slot of a frame. The process in the despreader 610 to the FHT unit 617 is the same as detection of the BS group specific code, except that the same correlation is obtained in each slot. The correlation of each slot is stored in a BS specific code correlation accumulator 627. Upon termination of the frame, a total of 1×16 correlations are accumulated in the BS specific code correlation accumulator 627. Then, a maximum correlation detector 629 detects a maximum of the accumulated correlations and determines a synchronization code corresponding to the maximum value as the BS specific code. Though the description of the present invention has been given in the context of the same code as a BS specific code in all slots, the cell search method is valid even if the BS transmits the BS specific code only in certain slots and the MS does not know which slots they are because correlations are calculated for all the slots.

The above MS cell search apparatus is capable of detecting the BS group specific code and the BS specific code from the S-SCH at the same time, thereby simplifying the conventional three-step cell search to two steps and reducing the number of complex additions from 16×256 to 416 (8×32+ 32×$\log_2$32).

Consequently, the need for 16 correlators to detect a BS specific code in the third cell search step is obviated, allowing a simplified cell search apparatus to be achieved. Furthermore, the decrease of the complex additions decreases hardware load and a cell search time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A signal transmitting apparatus for cell search in a mobile communication system, comprising:

a primary synchronization channel (P-SCH) transmitter for placing a first synchronization code at the start of each of a plurality of slots which forms one P-SCH frame to provide slot synchronization and for transmitting the P-SCH; and a secondary synchronization channel (S-SCH) transmitter for transmitting a base station group specific code at the start of each slot in an S-SCH frame and a base station specific code following the base station group specific code in at least one slot, the base station group specific code representing one of the base station groups and the base station specific code representing one of the base stations in the base station group, wherein correlation and detection operations of the cell search are performed in two steps and without searching a broadcast channel (BCH) for the base station specific code, and wherein a same synchronization code is inserted into each slot of a frame to transmit the base station specific code.

2. The signal transmitting apparatus of claim 1, further comprising a broadcast channel (BCH) transmitter for mapping system information of the base station on the S-SCH for transmission.

3. The signal transmitting apparatus of claim 1, wherein the S-SCH transmitter inserts each symbol of the base station group specific code in each slot of the frame.

4. The signal transmitting apparatus of claim 1, wherein the base station specific code is one of a synchronization codes which represent the base station BCH spreading code.

5. A signal transmitting method for cell search in a mobile communication system, comprising the steps of:
   transmitting a first synchronization code at the start of each of a plurality of slots which forms one P-SCH frame to provide slot synchronization and for transmitting the P-SCH; and
   transmitting a base station group specific code at the start of each slot in an S-SCH frame, the base station group specific code representing one of the base station groups, and transmitting a base station specific code following the base station group specific code in at least one slot, the base station specific code representing one of base stations in the base station group,
   wherein correlation and detection operations of the cell search are performed in two steps and without searching a broadcast channel (BCH) for the base station specific code, and wherein a same synchronization code is inserted into each slot of the frame to transmit the base station specific code.

6. The signal transmitting method of claim 5, further comprising the step of mapping system information of the base station on the S-SCH with a BCH and transmitting the BCH.

7. The signal transmitting method of claim 5, wherein each symbol of the base station group specific code is inserted in each slot of the frame in the S-SCH transmitting step.

8. A cell search apparatus in a mobile communication system, which is slot time-synchronized by receiving a first synchronization code in each slot of a P-SCH frame and in addition receives over the slots of an S-SCH frame a base station group specific code representing one of base station groups and a base station specific code representing one of base stations in the base station group, the apparatus comprising:
   a base station group specific code detecting unit that detects the base station group specific code received on the S-SCH in the slot-synchronized state; and
   a base station specific code detecting unit that detects the base station specific code received, the base station specific code received following the base station group specific code,
   wherein correlation and detection operations of the cell search are performed in two steps and without searching a broadcast channel (BCH) for the base station specific code, and wherein a same synchronization code is inserted into each slot of the frame to detect the base station specific code.

9. The cell search apparatus of claim 8, wherein the base station group specific code detecting unit comprises:
   a correlator for calculating a correlation of the base station group specific code received in each slot of the S-SCH frame; and
   a base station group detector for determining the base station group using specific codes corresponding to maxima of correlations detected from the slots.

10. The cell search apparatus of claim 9, wherein the base station group detector comprises:
    a cyclic shift operator for cyclic-shift operating the correlations and comparing the cyclically shifted correlation values with a comma free code table; and
    a maximum correlation detector for detecting a synchronization code corresponding to a maximum of the cyclic-shift operated correlations.

11. The cell search apparatus of claim 10, wherein the base station specific code detecting unit comprises:
    a correlator for calculating a correlation of the base station specific code received in each slot of the S-SCH frame; and
    a base station detector for determining the base station using a specific code corresponding to a maximum of correlations detected from the slots.

12. The cell search apparatus of claim 11, wherein the correlator calculates the correlations by Hadamard transformation with respect to a predetermined number of synchronization codes.

13. A cell search method in a mobile communication system which is slot time-synchronized by receiving a first synchronization code in each slot of a P-SCH frame and in addition receives over the slots of an S-SCH frame a base station group specific code representing one of base station groups and a base station specific code representing one of base stations in the base station group, the method comprising the steps of:
    detecting the base station group specific code received on the S-SCH in the slot-synchronized state; and
    detecting a transmitting base station by detecting the base station specific code received, the base station specific code received following the base station group specific code,
    wherein correlation and detection operations of the cell search are performed in two steps and without searching a broadcast channel (BCH) for the base station specific code, and wherein a same synchronization code is inserted into each slot of the frame to detect the base station specific code.

14. The cell search method of claim 13, wherein the base station group specific code detecting step comprises the steps of:
    calculating a correlation of the base station group specific code received in each slot of the S-SCH frame; and
    determining the base station group using specific codes corresponding to maxima of correlations detected from the slots.

15. The cell search method of claim 14, wherein the base station group determining step comprises the steps of:
    cyclic-shift operating the correlations and comparing the cyclically shifted correlation values with a comma free code table; and
    detecting a synchronization code corresponding to a maximum of the cyclic-shift operated correlations.

16. The cell search method of claim 13, wherein the base station specific code detecting step comprises the steps of:
    calculating a correlation of the base station specific code inserted in at least one slot of the S-SCH frame; and
    accumulating correlations and determining the base station using a specific code corresponding to a maximum of the accumulated correlations.

17. The cell search method of claim 16, wherein the correlations are calculated by Hadamard transformation with respect to a predetermined number of synchronization codes.

* * * * *